(12) United States Patent
Ando et al.

(10) Patent No.: US 12,105,063 B2
(45) Date of Patent: Oct. 1, 2024

(54) AUTO-SAMPLER FOR CHROMATOGRAPHS

(71) Applicant: SHIMADZU CORPORATION, Kyoto (JP)

(72) Inventors: Shotaro Ando, Kyoto (JP); Takashi Inoue, Kyoto (JP); Kenichi Yasunaga, Kyoto (JP)

(73) Assignee: SHIMADZU CORPORATION, Kyoto (JP)

(*) Notice: Subject to any disclaimer, the term of this patent is extended or adjusted under 35 U.S.C. 154(b) by 503 days.

(21) Appl. No.: 17/295,985

(22) PCT Filed: Dec. 12, 2018

(86) PCT No.: PCT/JP2018/045642
§ 371 (c)(1),
(2) Date: May 21, 2021

(87) PCT Pub. No.: WO2020/121430
PCT Pub. Date: Jun. 18, 2020

(65) Prior Publication Data
US 2022/0026401 A1    Jan. 27, 2022

(51) Int. Cl.
*G01N 30/24* (2006.01)
*G01N 30/18* (2006.01)
*G01N 30/20* (2006.01)

(52) U.S. Cl.
CPC ............ *G01N 30/24* (2013.01); *G01N 30/18* (2013.01); *G01N 30/20* (2013.01); *G01N 2030/185* (2013.01); *G01N 2030/207* (2013.01)

(58) Field of Classification Search
CPC .. G01N 30/24; G01N 30/20; G01N 2030/185; G01N 2030/207

(Continued)

(56) References Cited

U.S. PATENT DOCUMENTS 6,361,687 B1 * 3/2002 Ford ............... F16L 37/248
                                                      210/232
8,522,627 B2 * 9/2013 Maeda ............... G01N 30/24
                                                      73/863.72

(Continued)

FOREIGN PATENT DOCUMENTS

CN    101017161 A  *  8/2007  ............ G01N 30/18
CN    102187197 A     9/2011

(Continued)

OTHER PUBLICATIONS

International Search Report issued on Feb. 12, 2019 in corresponding International application No. PCT/JP2018/045642; 5 pages.

(Continued)

*Primary Examiner* — Peter J Macchiarolo
*Assistant Examiner* — Monica S Young
(74) *Attorney, Agent, or Firm* — Maier & Maier, PLLC

(57) ABSTRACT

The auto-sampler for chromatographs includes a needle for sampling configured to move while a tip end thereof faces vertically downward; a switching valve having a plurality of ports to which channels constituting a chromatograph are connected, the switching valve switching between port connecting conditions to switch between channel configurations; and an injection port including an opening at an upper surface thereof through which a tip end of the needle is inserted to make the needle fluidically communicate with a pipe connected to one port of the switching valve, and a needle seal configured to get into contact with an outer circumferential surface of the tip end portion to make the needle fluidically communicate with the pipe in a liquid-tight manner when the tip end of the needle is inserted through the opening.

7 Claims, 2 Drawing Sheets

(58) Field of Classification Search
USPC .......................................................... 73/61.52
See application file for complete search history.

(56) References Cited

U.S. PATENT DOCUMENTS

| | | | |
|---|---|---|---|
| 10,690,637 | B2 | 6/2020 | Yasunaga |
| 2007/0089603 | A1* | 4/2007 | Emmons ................ G01N 30/18 95/82 |
| 2011/0247405 | A1* | 10/2011 | Yasunaga ........... G01N 35/1097 73/61.55 |
| 2012/0111127 | A1* | 5/2012 | Maeda ............... G01N 35/1097 73/863.01 |
| 2013/0008237 | A1* | 1/2013 | Usowicz ............... G01N 30/16 73/61.52 |
| 2013/0014597 | A1* | 1/2013 | Yasunaga ............. G01N 30/24 73/863.72 |
| 2013/0019699 | A1* | 1/2013 | Usowicz ............ G01N 35/1009 73/864.85 |
| 2013/0062836 | A1* | 3/2013 | Maeda .................. G01N 30/18 277/607 |
| 2018/0088090 | A1 | 3/2018 | Yasunaga |

FOREIGN PATENT DOCUMENTS

| | | | | |
|---|---|---|---|---|
| CN | 102893065 | A | | 1/2013 |
| CN | 106770848 | A * | 5/2017 | ............ G01N 30/24 |
| JP | 2008-58064 | A | | 3/2008 |
| WO | 2010/044126 | A1 | | 4/2010 |
| WO | WO-2013174421 | A1 * | 11/2013 | ............ F16J 15/022 |
| WO | 2016/189720 | A1 | | 12/2016 |
| WO | WO-2017006410 | A1 * | 1/2017 | ............ G01N 30/20 |

OTHER PUBLICATIONS

Written Opinion of the International Searching Authority issued on Feb. 12, 2019 in corresponding International application No. PCT/JP2018/045642; 10 pages including Machine-generated English-language translation.
Office Action issued Dec. 14, 2021 in Japan Patent Application No. 2020-559599 with Computer Generated English translation; 10 pgs.
Office Action issued on Jul. 26, 2023, in corresponding Chinese Application No. 201880099691.1, 11 pages.
Office Action issued on Dec. 26, 2023, in corresponding Chinese Application No. 201880099691.1, 15 pages.
Office Action issued on Apr. 24, 2024, in corresponding Chinese Application No. 201880099691.1, 15 pages.

* cited by examiner

AUTO-SAMPLER FOR CHROMATOGRAPHS

TECHNICAL FIELD

The present invention is related to an auto-sampler used for chromatographs such as a liquid chromatograph and a supercritical fluid chromatograph.

BACKGROUND

According to the liquid chromatograph or the supercritical fluid chromatograph, auto-samplers are often used that automatically inject sample into an analysis channel in which mobile phase flows. The auto-sampler includes a switching vale for switching between the channel configurations, a needle for sampling, and a syringe pump for sucking liquid through the needle (Refer to Patent Citation 1).
PATENT CITATION 1: WO2017/006410A1

SUMMARY

The injecting port of the auto-sampler includes an opening on an upper surface thereof, and the needle is inserted through the opening to fluidically communicate the needle with a different channel. The injecting port includes a needle seal that keeps the fluid-tightness at a connection portion with the needle inserted through the opening of the upper surface. If this type of the injection port is directly provided at the switching valve, the structure of switching valve would become complicated, and it would become necessary to perform a difficult process on the housing of the switching valve, thereby increasing cost. Therefore, in some cases, the injecting port is provided separately from the switching valve, and the port of the switching valve and the injecting port are fluidically connected with each other through a pipe.

In a case where the port of the switching valve and the injecting port are fluidically connected with each other, a connecting method of using a male nut and a ferrule for connecting the pipe and the needle seal is generally employed. However, according to this method, it is necessary for a worker to fasten the nut while pressing the end surface of pipe against the needle seal, so that depending skill levels of the workers, a gap, which will become dead volume, may generate between the end surface of the pipe and the needle seal.

Since the connecting portion between the end surface of the pipe and the needle seal exist at a flow passage of analysis subject, the dead volume at this portion might cause diffusion of sample or carry-over, thereby adversely affecting result of the analysis. Therefore, structure of the injecting port is needed that can surely adhere the end surface of the pipe to the needle seal.

In addition, since the pipe that connects the injecting port and the port of the switching valve needs to be replaced with one having different inner diameter depending on the sample or the analyzing condition, the pipe is needed to be easily attached to or detached from the injecting port.

Accordingly, it is an object of the present invention to surely adhere the surface of the pipe to the needle seal of the injecting port and to make it easy for the pipe to be attached to or detached from the injecting port The present invention is related to an auto-sampler for chromatographs that injects sample into an analysis channel for chromatography. The auto-sampler for chromatographs according to the present invention includes a needle for sampling configured to move while a tip end thereof faces vertically downward; a switching valve having a plurality of ports to which channels constituting a chromatograph are connected, the switching valve switching between port connecting conditions to switch between channel configurations; and an injection port including an opening at an upper surface thereof through which a tip end of the needle is inserted to make the needle fluidically communicate with a pipe connected to one port of the switching valve, and a needle seal configured to get into contact with an outer circumferential surface of the tip end portion to make the needle fluidically communicate with the pipe in a liquid-tight manner when the tip end of the needle is inserted through the opening. The pipe has an end surface close to the injecting port facing vertically upward, and a broad member is fixed to an end portion of the pipe close to the injecting port, and the end surface of the pipe appears on an upper surface of the broad member. The injecting port includes a housing having a recess that accommodates the broad member, fixed to the end portion of the pipe, with the broad member being fitted in the recess from above, and a cap attached to the housing and having a through hole defining the opening. The needle seal is disposed on the upper surface of the broad member that is fitted in the recess of the housing, and is pressed against the end surface of the pipe by the cap that is attached to the housing.

The meaning of the end surface of the pipe "appears" on the upper surface of the broad member is that either the end surface of the pipe is disposed within the same plane of the upper surface of the broad member or the end surface of the pipe protrude from the upper surface of the broad member.

In the auto-sampler for chromatographs according to the present invention, the injection-port-side end surface of the pipe for fluidically communication the port of switching valve and the injecting port faces vertically upward, the broad member is fixed to the injection-port-side end portion of the pipe, the end surface of the pipe appears on the upper surface of the broad member, the housing of the injecting port is provided with a recess into which the broad member is fitted from above and is accommodated, the needle seal is disposed on the upper surface of the broad member that is fitted in the recess of the housing, and the needle seal is pressed against the end surface of the pipe by the cap attached to the housing. According to this structure, the end surface of the pipe is surely adhered to the needle seal of the injecting port, and the pipe can be easily attached to or detached from the injecting port easily.

DETAILED DESCRIPTION

Figure 1:
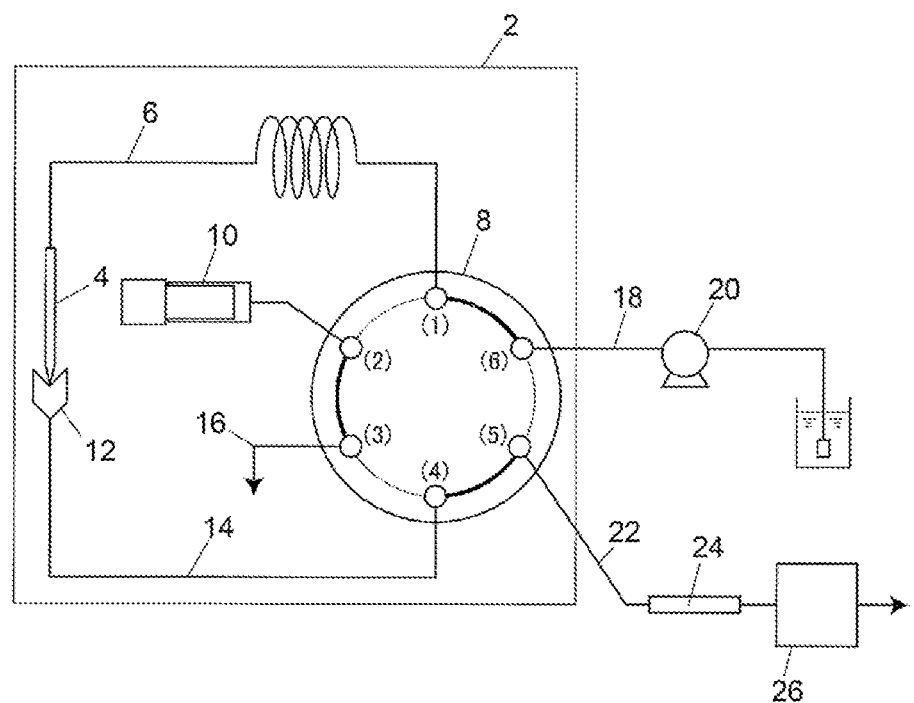
FIG. 1 is a configuration diagram schematically showing one embodiment of an auto-sampler for chromatographs.

Below, referring to the figures, one embodiment of an auto-sampler for chromatographs will be explained. An auto-sampler for a liquid chromatograph will be explained as an example, but the present invention can be applied to an auto-sampler used for a supercritical fluid chromatograph as well.

An auto-sampler 2 mainly includes a needle 4 for sampling, a sample loop 6, a switching valve 8, a syringe pump 10 (pump portion), and an injecting port 12.

The needle 4 has a tip end and a base end, and the tip end faces vertically downward to suck sample. To the base end of the needle 4, one end of the sample loop 6 is fluidically connected. The sample loop 6 is a channel for keeping the sample sucked through the tip end of the needle 4, and has another end on the opposite side of the needle 4, which is in fluid connection to one port (1) of the switching valve 8. The needle 4 is moved in the vertical direction and directions within a horizontal plane by a motion mechanism (not shown).

The switching valve 8 switches between channel configurations, and is a six port valve in this embodiment. To each port of the switching valve 8, the syringe pump 10, a pipe 14 communicated with the injecting port 12, a drain passage 16, a mobile phase supply passage 18, and an analysis channel 22 are connected, other than the sample loop 6. The mobile phase supply passage 18 is a channel for supplying mobile phase through a liquid delivery pump 20. The analysis channel 22 is a channel in which a separation column 24 and a detector 26 are provided. The switching valve 8 switches between a condition in which the mobile phase supply passage 18 and the analysis channel 22 are directly connected (the port (5) and the port (6) are communicated) and a condition in which the sample loop 6 and the needle (4) are intervened between the mobile phase supply passage 18 and the analysis channel 22 (the port (1) and the port (6) are communicated, and the port (2) and the port (3) are communicated, and the port (4) and the port (5) are communicated, as shown in FIG. 1).

The syringe pump 10 is provided to be in fluid communication with the needle 4 by the switching valve 8 through the sample loop 6, and sucks the sample through the needle 4.

The injecting port 12 is in fluid communication with one port of the switching valve 8 through the pipe 14, and leads the sample that has been sucked through the tip end of the needle 4 and retained in the sample loop 6, to the analysis channel 22.

Figure 2:
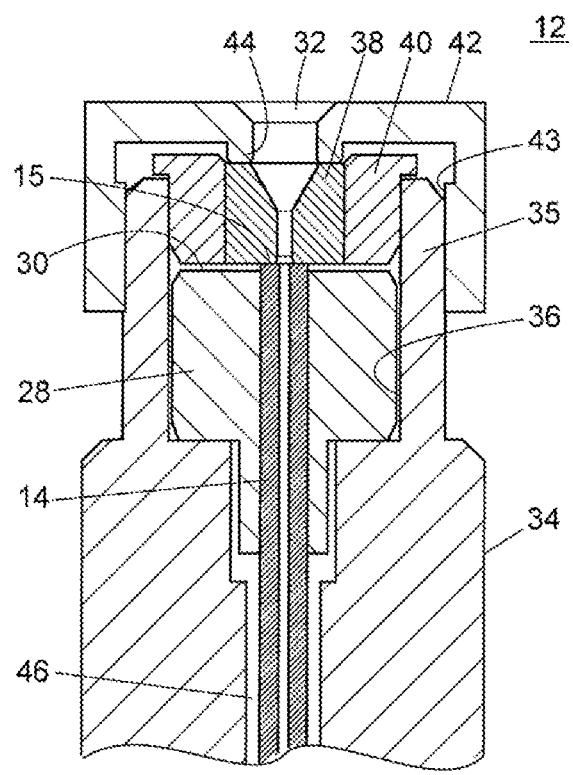
FIG. 2 is a sectional view showing the structure of the injecting port in the embodiment.

Referring to FIG. 2, the structure of the injecting port 12 will be explained.

The injecting port 12 includes an opening 32 through which the needle 4 is inserted from above, and the needle 4 inserted through the opening 32 is in fluid communication with a pipe 14 that is connected on one port (4) of the switching valve 8. The injecting port 12 includes a housing 34, a needle seal 38, a spacer 40, and a cap 42.

An end portion of the pipe 14 close to the injecting port 12 is held in the housing 34 of the injecting port 12 while an end surface 15 faces vertically upward. To the outer surface of the end portion of the pipe 14 close to the injecting port 12, a broad member 28 is fixed that is cylindrical and is made of metal. The method of securing the broad member 28 to the pipe 14 is not especially limited, and includes a securing method such as welding for tightly fixing the metals. The end surface 15 of the pipe 14 appears on an upper surface 30 of the broad member 28. "Appear" means that either the end surface 15 of the pipe 14 is positioned within the same plane of the upper surface 30 of the broad member 28 or the end surface 15 of the pipe 14 projects from the upper surface 30 of the broad member 28. In FIG. 2, the end surface 15 of the pipe 14 projects upward from the upper surface 30 of the broad member 28.

The housing 34 includes a recess 36 opening upward for receiving the broad member 28 from above. The broad member 28 is fitted in the recess 36. The broad member 28 is fitted in the recess 36 of the housing 34, and the lower surface of the broad member 28 is in contact with the bottom surface of the recess 36, so that position of the end surface 15 of the pipe 14 in the housing 34 is fixed.

The needle seal 38 and the spacer 40 are disposed on the upper surface 30 of the broad member 28, which is fitted in the recess 36 of the housing 34. The needle seal 38 is in directly contact with the tip end portion of needle 4 inserted through the opening 32 to fluidically communicate the needle 4 with the pipe 14 in a liquid tight manner. The spacer 40 is an annular member located between the outer circumferential surface of needle seal 38 and the inner circumferential surface of the recess 36 to fix position of needle seal 38. Since the end surface 15 of the pipe 14 appears on the upper surface 30 of the broad member 28, simply disposing the needle seal 38 on the broad member 28 allows the end surface 15 of the pipe 14 and the lower surface of needle seal 38 to be into contact with each other. The needle seal 38 is press-fitted in the spacer 40 to be one integral component. The spacer 40 is fitted in the recess 36 of the housing 34.

The cap 42 is attached to the housing 34 so as to cover an upper portion 35 of the housing 34. The inner circumferential surface of the cap 42 is formed with a screw to be screwed with a screw formed on the outer circumferential surface of the upper portion 35 of the housing 34. By rotating the cap 42 relative to the housing 34 within a horizontal plane, the cap 42 is attached to or detached from the housing 34. The cap 42 is provided with a through hole defining an opening 32 thorough which the needle 4 is inserted from above. The lower surface of cap 42 is formed with a pressing portion 44 extending downward from a periphery of the through hole defining the opening 32. When the cap 42 is attached to the housing 34, the pressing portion 44 gets into contact with the upper surface of needle seal 38 and presses the needle seal 38 against the end surface 15 of the pipe 14 according to the tightening of the cap 42.

The mechanism of attaching the cap 42 to the housing 34 is not limited to one using screwing by screws. Any mechanisms can be employed so long as it is possible to attach the cap 42 to the housing 34 while generating a pressing force on the needle seal 40.

Figure 3:
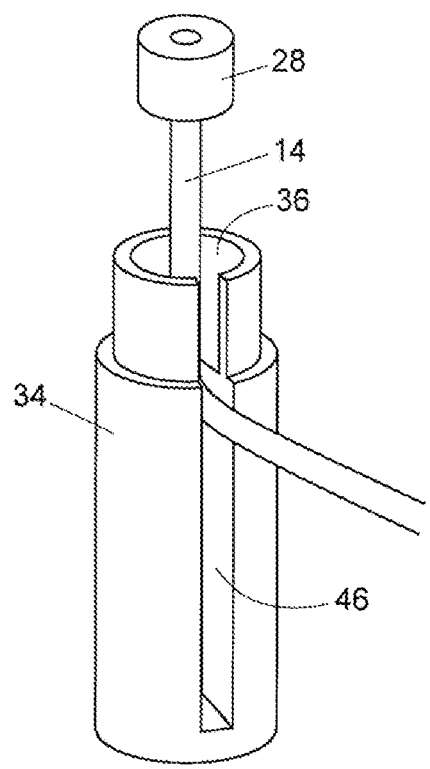
FIG. 3 is a perspective view showing the appearance of the injecting port in the embodiment.

The housing 34 is formed with a slit 46 extending in the vertical direction. The slit 46 has a width larger than the outer diameter of the pipe 14. As shown in in FIG. 3, when the broad member 28 fixed to the end portion of the pipe 14 is fitted into the recess 36 or the broad member 28 is taken out of the recess 36, the pipe 14 passes though the slit 46. The slit 46 allows the pipe 14 to be easily attached to or be detached from injecting port 12.

According to the above-described structure, by simply fitting the broad member 28 fixed to the end portion of the pipe 14 into the recess 36 of the housing 34, disposing the needle seal 38 and the spacer 40 on the broad member 28, attaching the cap 42 to the upper portion 35 of the housing 34 and fastening the cap 42, the lower surface of needle seal 38 are pressed against the end surface 15 of the pipe 14 to surely keep fluid-tight between the pipe 14 and the needle seal 38. Especially, as shown in FIG. 2, since the end surface 15 of the pipe 14 projects from the upper surface of the broad member 28, stress generated in the needle seal 38 due to the fastening of the cap 42 concentrates on small contact surfaces between the end surface 15 and the needle seal 38, thereby ensuring high sealing property and improving pressure resistance.

The auto-sampler 2 described above employs "total-volume injection manner", wherein after the sample is sucked through the tip end of needle 4, and the total amount of the sucked sample is injected into the analysis channel 22. However, the present invention is not limited to the previously described manner. The auto-sampler including the structure of "loop injecting method" (for example, refer to FIG. 7 of Patent Citation 1), wherein a certain amount of the sample sucked by the needle is injected into a different sample loop and is introduced into the analysis channel.

One embodiment an auto-sampler for chromatographs according to the present invention includes a needle (4) for sampling configured to move while a tip end thereof faces vertically downward; a switching valve (8) having a plurality of ports to which channels constituting a chromatograph are connected, the switching valve (8) switching between port connecting conditions to switch between channel configurations; and an injection port including an opening (32) at an upper surface thereof through which a tip end of the needle (4) is inserted to make the needle (4) fluidically communicate with a pipe (14) connected to one port of the switching valve (8), and a needle seal (38) configured to get into contact with an outer circumferential surface of the tip end portion to make the needle fluidically communicate with the pipe in a liquid-tight manner when the tip end of the needle (4) is inserted through the opening (32). The pipe (14) has an end surface (15) close to the injecting port (12) facing vertically upward, and a broad member (28) is fixed to an end portion of the pipe (14) close to the injecting port (12), and the end surface of the pipe (14) appears on an upper surface (30) of the broad member (28). The injecting port (12) includes a housing (34) having a recess (36) that accommodates the broad member (28), fixed to the end portion of the pipe (14), with the broad member (28) being fitted in the recess (36) from above, and a cap (42) attached to the housing (34) and having a through hole defining the opening (32). The needle seal (38) is disposed on the upper surface (30) of the broad member (28) that is fitted in the recess (36) of the housing (34), and is pressed against the end surface (15) of the pipe (14) by the cap (42) that is attached to the housing (34).

According to an aspect [1] of the previously described embodiment, the end surface (15) of the pipe (14) close to the injecting port (12) projects from the upper surface (30) of the broad member (28). Accordingly, since the stress in the needle seal (38) caused by the cap (42) concentrates on small contact surfaces between the end surface (15) of the pipe (14) and the needle seal (38), high sealing property is ensured and pressure resistance is improved.

According to an aspect [2] of the previously described embodiment, the pipe (14) and the broad member (28) are made of metal, and the broad member (28) is welded to the pipe (14). Accordingly, the broad member (28) is tightly fixed to the pipe (14). Accordingly, even if the cap (42) is attached to the housing (34) with a strong force, and the needle seal (38) is strongly pressed against the end surface (15) of the pipe 14, the broad member (28) does not deviate from the pipe (14), thereby obtaining high pressure resistance.

According to an aspect [3] of the previously described embodiment, a side surface of the housing (34) of the injecting port (12) is formed wish the slit (46) that allows the pipe (14) to pass through when the broad member (28) is fitted into or is taken out of the recess (36). Accordingly, the pipe (14) can be easily attached to or be detached from the injecting port (12).

According to an aspect [4] of the previously described embodiment, the cap (842) of the injecting port (12) is attached to the housing (34) by screwing of screws. Accordingly, it is possible to adjust pressing force of the needle seal (38) to the end surface (15) of the pipe (14) the housing (34) by degree of fastening of the cap (42).

According to an aspect [5] of the previously described embodiment, the cap (42) of the injecting port (12) includes a pressing portion (44) that extends downward from a periphery of the through hole to press the upper surface of the needle seal (38) from above. Accordingly, when the cap (42) is attached to the housing (34), the needle seal (38) can be efficiently pressed against the end surface (15) of the pipe (14).

According to an aspect [6] of the previously described embodiment, the injecting port (12) includes the spacer (40). The spacer (40) is interposed between the inner circumferential surface of the recess (36) and the outer circumferential surface of the needle seal (38) to fix position of the needle seal (38). Accordingly, it is possible to prevent positional shift of the needle seal (38).

The aspects [1]-[6] can be freely combined with each other.

REFERENCE SIGNS LIST 2 auto-sampler
4 needle
6 sample loop
8 switching valve
10 syringe pump
12 injecting port
14 pipe
15 end surface of pipe
16 drain passage
18 mobile phase supply passage
20 liquid delivery pump
22 analysis channel
24 separation column
26 detector
28 broad member
30 upper surface of broad member
32 opening
34 housing
35 upper portion of the housing
36 recess
38 needle seal
40 spacer
42 cap
44 pressing portion
46 slit

The invention claimed is:

1. An auto-sampler for chromatographs configured to inject sample into an analysis channel for chromatography, comprising:
a needle for sampling configured to move while a tip end thereof faces vertically downward;
an injection port provided as a member separate from a switching valve; and
a pipe that fluidically connects one port of the switching valve with the injection port;
wherein the injection port comprises:
an opening at an upper surface of the injection port, through which a tip end of the needle is inserted to make the needle fluidically communicate with the pipe,
a needle seal configured to get into contact with an outer circumferential surface of the tip end portion to make the needle fluidically communicate with the pipe in a liquid-tight manner when the tip end of the needle is inserted through the opening, a housing having a recess that accommodates a broad member, fixed to an end portion of the pipe, with the broad member being fitted into the recess from above, and a cap attached to the housing and having a through hole defining the opening;

wherein the pipe has an end surface close to the injection port facing vertically upward, and the end surface of the pipe appears on an upper surface of the broad member;

wherein the needle seal is disposed on the upper surface of the broad member that is fitted in the recess of the housing, and is pressed against the end surface of the pipe by the cap that is attached to the housing; and wherein a slit is formed on a side wall of the housing of the injection port, extending from an outer side surface of the housing to an interior of the housing, allowing the pipe to pass through the side wall of the housing via the slit when the broad member is fitted into or is taken out of the recess.

2. The auto-sampler for chromatographs according to claim 1, wherein the end surface of the pipe close to the injection port projects from the upper surface of the broad member.

3. The auto-sampler for chromatographs according to claim 1, wherein the pipe and the broad member are made of metal, and the broad member is welded to the pipe.

4. The auto-sampler for chromatographs according to claim 1, wherein the cap of the injection port is attached to the housing by screwing of screws.

5. The auto-sampler for chromatographs according to claim 1, wherein the cap of the injection port includes a pressing portion that extends downward from a periphery of the through hole to press an upper surface of the needle seal.

6. The auto-sampler for chromatographs according to claim 1, wherein the injection port includes a spacer that is disposed between an inner circumferential surface of the recess and an outer circumferential surface of the needle seal to fix position of the needle seal.

7. The auto-sampler for chromatographs according to claim 1, wherein the end surface of the pipe protrudes from the upper surface of the broad member and is flush with a bottom surface of the needle seal.

* * * * *